United States Patent [19]
Ivchenko

[11] 3,921,292
[45] Nov. 25, 1975

[54] METHOD OF BONDING CURED RUBBER AND ACRYLIC RESIN USEABLE IN MAKING A COMPOSITE DENTURE PROSTHESIS

[76] Inventor: Wasil Ivchenko, 9120 Brecksville Road, Brecksville, Ohio 44141

[22] Filed: Feb. 22, 1974

[21] Appl. No.: 444,950

[52] U.S. Cl. .................................................. 32/2
[51] Int. Cl.² ........................................ A61C 13/00
[58] Field of Search ............. 32/2, 8, 1; 264/15, 16, 264/131, 255

[56] References Cited
UNITED STATES PATENTS
2,714,559   8/1955   Sheffield et al. ................ 264/131
3,659,344   5/1972   Gavazzi ................................ 32/2

*Primary Examiner*—Russell R. Kinsey
*Assistant Examiner*—J. Q. Lever
*Attorney, Agent, or Firm*—Jones, Tullar & Copper

[57] ABSTRACT

A method of bonding cured rubber and acrylic resin together which is suitable for use in making a denture prosthesis in which the rubber serves as a base plate with the acrylic resin being utilized as a tooth carrying portion. Bonding of the rubber and acrylic portions of the prosthesis is accomplished by partially embedding particles of metal alloy in a peripheral portion of the rubber base plate before curing the plate. The tooth-carrying acrylic resin portion of the denture is joined to the rubber base plate with the embedded metal particles serving to key the two portions together, thereby providing a strong, well-fitting and aesthetically pleasing prosthesis.

4 Claims, 10 Drawing Figures

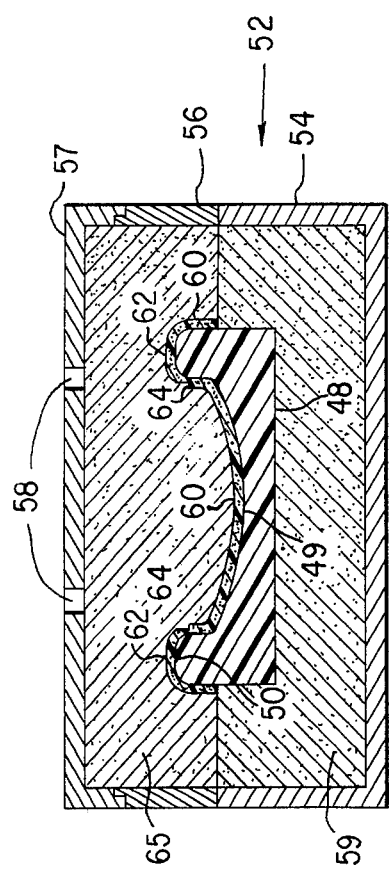
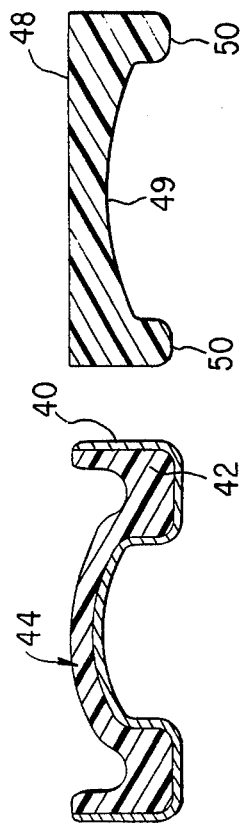
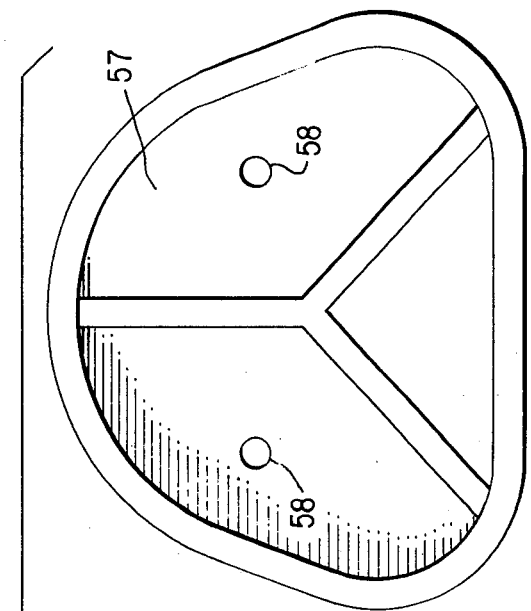
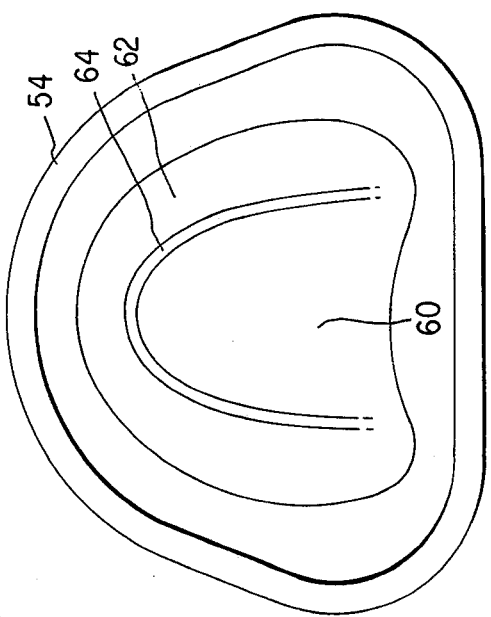
FIG. 3
FIG. 4
FIG. 5
FIG. 6

METHOD OF BONDING CURED RUBBER AND ACRYLIC RESIN USEABLE IN MAKING A COMPOSITE DENTURE PROSTHESIS

FIELD OF THE INVENTION

The present invention is directed generally to a process for bonding together cured rubber and acrylic resin which is suitable for use in making a dental prosthesis and the denture so produced. More particularly, the invention provides for the making of a denture comprised of a cured rubber base plate and a hard acrylic resin tooth carrying portion joined thereto. Most specifically the present invention is directed to a method for joining together the rubber base plate and the acrylic tooth carrying portion wherein metal powder is partially embedded in the periphery of the rubber base plate portion of the denture and serves to key the base plate portion to the acrylic resin portion of the prosthesis. The resulting denture is more comfortable to the wearer yet provides a natural appearance due to the use of the acrylic resin as the tooth carrying and hence visible portion of the prosthesis.

DESCRIPTION OF THE PRIOR ART

The use of dentures to replace lost or decayed natural teeth is well known and has been practiced for many years. Recorded history carries many references to false teeth, although these references have usually been unfavorable since dentures have, in the past, generally been ill-fitting or unsightly, or both. While the art of making dental prostheses has progressed from the use of wood and whalebone to that of using modern acrylic resins and the like, the main problems still remain.

Although present dentures made of acrylic resins are acceptable from an aesthetic point of view, since the resin can be colored to resemble the natural coloration of the mouth, they have a number of faults which have yet to be overcome. Chief among these is that, due to their rigidity, they are uncomfortable in use, and are not easily retained in the wearer's mouth. An impression is made of the patient's mouth and a mold, which is used to make the plate of the denture is made from this impression. Hence the denture surface which mates with the patient's mouth must mate exactly or it will be uncomfortable. Since it is often quite difficult to obtain a perfect impression of the mouth, and also since the surface of the roof of the mouth and other internal mouth portions may change with time, it becomes obvious why so many sets of false teeth are used as infrequently as possible since their use is apt to cause discomfort to their owner.

The acrylic resin used in the production of dentures is a rigid, non-elastic, smooth composition that provides for firm support of the false teeth, but it also creates problems of breakage if the denture is inadvertently dropped or otherwise mishandled. Dentures are expensive and when this initial cost is coupled with the added expense of repairs necessitated by breakage, the cost soon becomes rather large so that those who need false teeth will perhaps either not obtain them or will use them only infrequently.

Yet another area of concern with dentures is the inability of the user to be able to keep the prosthesis in place once it has been inserted in his mouth. Any number of adhesives such as powders, pastes, creams and the like together with various liners and vacuum-producing chambers have been provided in the prior art and all promise to securely hold and retain the denture in the wearer's mouth. Unfortunately, these claims are apt to be somewhat overstated and the wearer of the prosthesis finds himself hesitant to eat or talk as he would like for fear of embarrassing himself because his dentrues will not stay in place.

In addition, the acrylic resin generally used to make dentures may be unacceptable to some potential users for physiological reasons. Patients with allergies or other ailments resulting in pathological changes in the oral cavity may not be able to tolerate the material used to fabricate the usual set of false teeth and must, therefore, turn to more exotic and usually more expensive dentures made from materials which do not cause such problems.

Rubber cured, for example, by vulcanization has, in the past, also been used to make dental prostheses since it is relatively flexible and hence comfortable to wear, but its use has met with very limited acceptance in this country for several reasons. The first of these is one of aesthetics since it is not feasible to color the rubber so that it will have a natural appearance. This has virtually stopped the use of cured rubber for use in false teeth since its dark red to pink color is unacceptable to most persons. Cured rubber is also unsatisfactory since the heat needed to cure it would melt acrylic false teeth placed therein, thus requiring the use of porcelain or other similar materials to form the false teeth. Such materials do not permit the matching of the coloration of natural teeth and are also easily broken and complicated to repair.

One solution to the above discussed problems of either acrylic resin or cured rubber dentures is to make a composite denture, i.e., one that utilizes the advantages of both acrylic resin and cured rubber without being restricted by either of their shortcomings. This can best be accomplished by making a prosthesis in which the tooth holding and therefore visible portion is made from acrylic resin to provide firm support for the teeth and a pleasant appearance, and in which the base plate or mouth engaging portion is comprised of vulcanized or similarly cured rubber for confort and a good fit. The rubber portion and acrylic portion must obviously be joined together to produce a single denture and herein lies the problem. In the past, no acceptable solution to this bonding or joining problem, which may be used in making denture prostheses, has been found. Hence the apparently most desirable solution to the problems of dentures has not been feasible since there has been no practical solution to the problem of providing a method for joining the two dissimilar materials together.

SUMMARY OF THE INVENTION

It is, therefore, an object of the present invention to provide a method for bonding cured rubber and acrylic resin together which is suitable for use in making a denture prosthesis in which the rubber is used as a base plate and the acrylic resin is the tooth carrying portion of the denture.

It is a further object of the present invention to provide a dental prosthesis that is comfortable to wear and aesthetically pleasing.

Yet another object of the present invention is to provide a dental prosthesis which is easily made, is durable, and is not expensive.

Still another object of the present invention is to provide a method of bonding cured rubber and acrylic resin to form a composite product.

The denture in accordance with the present invention is a composite article in that the tooth carrying and hence visible portion of the prosthesis is made of acrylic resin of the type presently used for dentures, while the alveolar ridge engaging base plate portion, and the palate portion in an upper denture, is of cured rubber. As will be described more fully hereinafter, this denture is constructed by first making a working model of the patient's mouth from an impression taken by a dentist. A curable rubber sheet is then positioned on the model, cut to shape, heated, and a metal alloy powder partially embedded in its periphery. The rubber is cured and an acrylic resin tooth carrying portion is formed from the model. The rubber and acrylic portions are then joined together, with the metal powder now being embedded in both the periphery of the base plate portion and the tooth carrying portion and acting as a keying means or agent to provide a tight, secure bond between the two dissimilar materials.

The denture made in accordance with the method of the present invention combines the best features of both acrylic resin and cured rubber dentures while eliminating most of their respective disadvantages.

As previously discussed, dentures made from acrylic resin alone are rigid and hence provide for good tooth support but also are likely to be uncomfortable in the wearer's mouth. The denture of the present invention resolves this problem by substituting more resilient and hence comfortable cured, as for example vulcanized, rubber for the palate and alveolar ridge engaging base plate portions of the denture. This rubber, while contoured generally to the shape of the user's mouth, is resilient enough to compensate for errors made during the impression taking procedure and also to allow for the minor changes which take place in the shape of a person's mouth and palate.

The present denture is also quite strong and is particularly so at the chronic weak point of conventional dentures, i.e., the anterior portion over the alveolar ridge. In conventional dentures, this portion is of acrylic resin while in the present assembly this portion is comprised of three layers — cured rubber, metal powder and acrylic resin. Thus the weak point of conventional dentures is eliminated so that the present denture, which is also light in weight, is less apt to become damaged and need costly repair.

While conventional dentures are apt to be difficult to keep in place and require pastes, powders, or other forms of adhesives, the present device is much easier to keep in place since the resilient rubber base plate closely engages the wearer's mouth. While a powder or cream denture adhesive may be utilized if desired, the present denture will adhere well without the use of such bothersome aids. Thus the wearer will have added confidence in his ability to eat and speak normally and will not feel as selfconscious as he would if he were using a conventional denture.

The denture in accordance with the present invention is also quite impermeable to the fluids of the mouth and does not affect the growth of desirable bacteria. The tissues of the mouth will also tolerate the cured rubber to a much greater extent than they will the acrylic, and persons who, for one reason or another, do not physiologically adapt to a conventional denture are able to use the present device.

Since the present denture retains the use of acrylic resin for the tooth carrying portion of the prosthesis, the problems encountered in the use of an all-rubber denture are avoided. The acrylic resin provides a strong base for inserting and retaining the false teeth and is also capable of being colored so as to conform to the natural mouth color of the wearer, hence providing a denture which is natural appearing and which is strong enough to allow for normal usage. The cured rubber portion, which is not easily colorable and which is a somewhat darker color, is hidden from view since it is used only in the interior portions of the mouth and as a non-visible base for the acrylic portion. Thus the present denture includes the desirable features of both the resin and rubber while eliminating their less desirable aspects.

The method of bonding the resin and rubber portions together which allows for the production of the present denture is quite satisfactory in terms of strength, ease of use, and expense. The use of a metal alloy powder as the keying agent allows the joining of the two dissimilar materials to provide a strong, uniform bond that has no voids or crevices in which food particles may become trapped. This method of bonding solves the problem of how to provide a two-part denture and provides a prosthesis which is comfortable, natural in appearance, particularly easy to retain in place, strong so as not easily damaged in ordinary use, easily manufactured and not expensive.

BRIEF DESCRIPTION OF THE DRAWINGS

While the novel features of the invention are set forth with particularity in the appended claims, the invention will be understood more fully and completely from the following detailed description of a preferred embodiment and as set forth in the accompanying drawings, in which:

FIGS. 3–5 are schematic cross-sectional views of various steps of the process of making the denture;

FIG. 6 is a top plan view of the flask used in the present invention showing one step of the process being performed; and, FIGS. 7–10 are schematic cross-sectional views of various remaining steps in the process of making a denture in accordance with the present invention.

DESCRIPTION OF A PREFERRED EMBODIMENT

Figure 1:
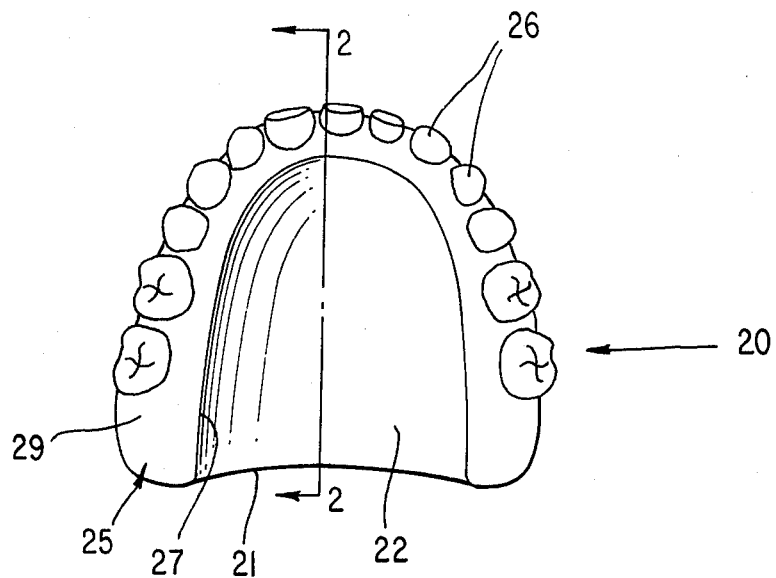
FIG. 1 is a top plan view of a denture prosthesis made in accordance with the present invention.

Turning now to FIG. 1 there is shown generally at 20 a denture prosthesis in accordance with the present invention. Denture 20 is shown as being an upper prosthesis although it will be understood that either upper or lower dentures may be made in accordance with the method of the present invention. For the sake of simplicity the ensuing description will be directed to an upper denture prosthesis.

Denture 20 is comprised of three portions; a cured rubber base plate 22, an acrylic resin tooth carrying portion 25, and a plurality of false teeth 26 of conventional material, carried by the acrylic resin portion 25.

The terms "cure," "curable" and "curing" as employed herein are used in the generic sense as by the dental profession to define the hardening process of a denture base material, as by polymerization, vulcanization, cross-linking or fusion.

Generally speaking, methyl methacrylate is the preferred material used to make the acrylic portion 25 of the denture. However, the term "acrylic" as employed herein is intended to cover any of the conventional related denture base materials. Such materials are well known to those skilled in the art and are adequately described elsewhere in the literature so no useful purpose would be served by discussing them in detail here.

Figure 2:
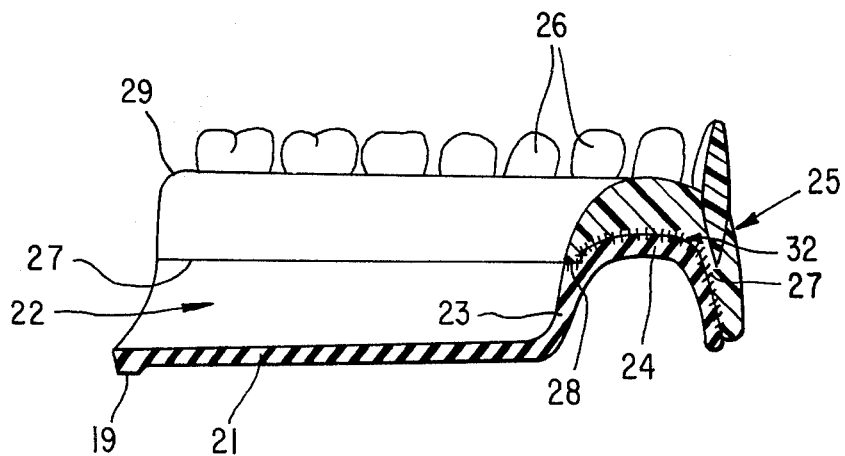
FIG. 2 is a cross sectional elevation view of the denture taken along line 2—2 of FIG. 1.

Rubber base plate 22, as seen most clearly in FIG. 2, is provided with a generally flat palate engaging portion 21 which includes a conventional palatal dam 19, an upwardly extending sidewall 23 and a portion 24, generally U- or channel-shaped in cross-section, which engages the alveolar ridge of the wearer. The acrylic resin tooth carrying portion, or piece, 25 is also generally U-shaped in cross-section, with its inner concave surface engaging, along junction 27, the upper convex surface of the alveolar ridge engaging portion 24 of rubber base plate 22. An inwardly extending lip 28 is formed on the upwardly extending rubber sidewall 23 of plate 22 and provides a shoulder to which the interior edge of acrylic resin portion 25 is joined so as to produce a smooth transition between the rubber and acrylic which will not irritate the tongue of the user. The upper, generally convex, surface of the acrylic resin portion 25 is provided with a generally flat tooth carrying surface 29 into which the teeth 26 are positioned. The tooth carrying surface 29 is on the portion of the acrylic resin piece 25 opposite from the piece's engagement with alveolar ridge engaging channel 24 of base plate 22.

While the above described denture 20 is of generally known shape, it is distinct from prior dentures since it is a composite unit, i.e., since the base plate 22 which engages the roof and alveolar ridge of the user's mouth is made of cured rubber as opposed to conventional dentures in which the entire prosthesis, except for the teeth, is made of acrylic resin similar to that used in the tooth carrying portion 25 of the present device. The process of joining the rubber and resin portions of the denture to make this composite article, as will now be described, utilizes embedded metal particles 32, as seen in FIG. 2, as the keying agent at the junction, or interface 27, of the rubber and resin portions of the prosthesis.

The process of making the denture prosthesis is commenced in the usual way with an impression being made of the patient's mouth. As diagrammatically illustrated in cross-section in FIG. 3, a conventional impression plate 40 is filled with a known impression-making material 42 and an impression 44 is made. After the impression material 42 has set, a conventional dental plaster is poured into the impression. After approximately 15 minutes, the plaster has hardened sufficiently to allow model 48, having a generally flat or slightly curved palate 49 and upstanding peripheral alveolar ridge 50, as seen in FIG. 4, to be removed from the impression. The techniques and materials used in the above steps are well known and need not be further discussed.

A sheet of conventional dental-modeling wax 60, in FIG. 5, for example 10 or 16 gauge S. S. White "Tenax" depending on the needs of the patient, in accordance with known dental procedures, is placed over the palate portion 49 and the alveolar ridge portion 50 of the model 48 and the palatal dam portion 19 is formed. Additional wax 62 is added above the top of ridge 50, is shaped to the patient's requirements, and a shoulder 64, which will eventually be used as lip 28 of base plate 22, as seen in FIG. 1, is formed in the wax. Model 48 with wax 60 and 62 in place is now positioned in a conventional holder or flask generally indicated at 52 in FIG. 5. Flask 52 is of generally semi-circular shape and is comprised of lower and upper sections 54 and 56 as seen in both FIGS. 5 and 6. Upper section 56 is provided with a cover portion 57 having apertures 58, the use of which will be discussed hereinafter. As seen in FIG. 5, model 48 is placed in the lower half of flask 54 with alveolar ridge portion 50 extending upwardly, and the lower flask half is filled with plaster or a similar hardenable material 59. Upper half 56 of flask 52 is then secured above lower half 54 by securing means (not shown) to form a walled container and additional plaster is added through openable cover 57 thereby filling the upper half of the flask as at 65. The cover is closed forcing any excess plaster out through apertures 58. The plaster is allowed to harden, the flask is placed in boiling water for 6 to 7 minutes, opened, and washed to remove the wax 60, 62 and the flask halves are kept in a hot condition.

There is now provided a two part mold with a void where the wax has been melted away.

Figure 8:
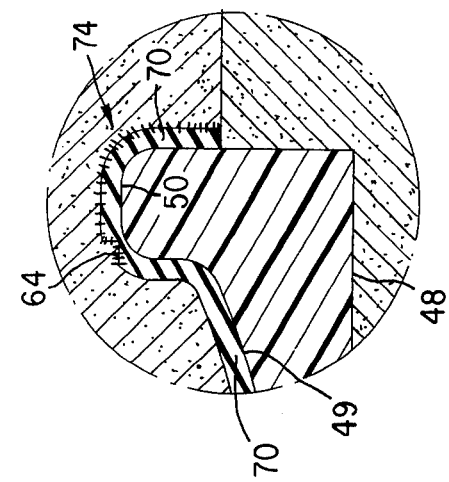
Figure 7:
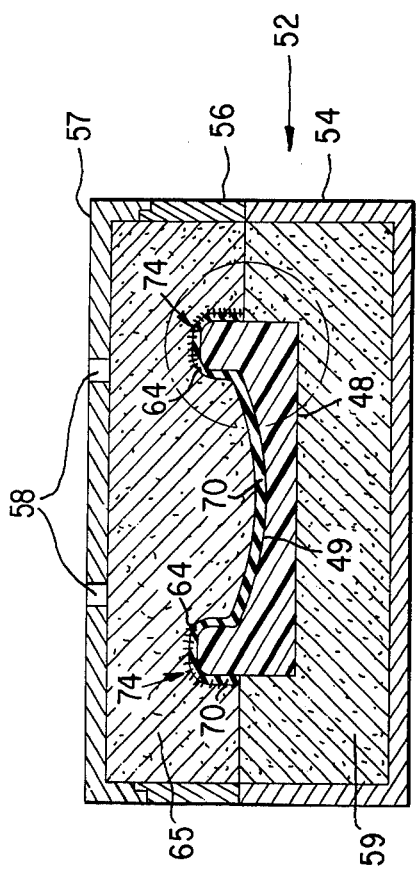

Referring now to FIGS. 7 and 8, model 48 is covered with a sheet of curable rubber 70, such rubber sheet covering palate portion 49 of the model and extending upwardly over the interior side of a alveolar ridge 50 and down over the exterior side of the alveolar ridge 50 of the model 48 to a point where it engages the dental plaster 59 in lower flask section 54. The sheet of rubber is then covered with a thin sheet of silicon paper, "Dent Silk," or the like (not shown) which functions to prevent sticking, the upper flask half is put in place and secured and the assembly preferably is heated for 5 to 8 minutes thereby conforming the rubber to the shape of the model and hence to the shape of the palate and alveolar ridge of the ultimate wearer from whom the model was made.

The flask halves are separated, the silicon sheet removed, and a uniformly distributed layer of metal alloy powder 74 is placed on the alveolar ridge portion of the rubber sheet, the powder extending from shoulder 64 to the exterior edge of the sheet to substantially cover this portion of the sheet, as seen both in FIG. 7 and FIG. 8. Since the rubber is still warm from the previous step, the metal powder will adhere readily to it.

Alternatively, after the flask halves have been separated, a portion of the plaster in the upper flask half (not shown) is filmed or coated with liquid silicon and immediately coated with a layer of metal alloy powder. The area coated with the powder extends from the portion of the plaster mold which engages shoulder 64 on the base plate outwardly to the periphery of the mold. The alloy powder readily adheres to the liquid silicon and is thereby held in place.

The flask halves are again closed and secured thereby pressing the metal powder, which has been carried either by the rubber sheet or by the plaster in the upper flask half, partially into the surface of rubber sheet 70 due to the pressure exerted by the closed flask. The assembly is now heated to approximately 320° F in steps, reaching the maximum temperature in about 20 minutes, and is kept at this elevated temperature for a total heating time of approximately 2 hours. The rubber sheet is thus cured and the metal particles 74 securely partially embedded in the surface of the sheet's upper peripheral or alveolar ridge portion.

The metal powders used in this process may be of, for example, aluminum alloy or nickel-chromium alloy or other suitable alloys. The particular powder used should be unoxidized initially and should be capable of remaining unoxidized through the curing process and should also have substantial resistance to oxidization or other chemical changes brought about by its insertion into the human mouth. In the preferred embodiment, the powder used is formed from an aluminum alloy commercially available as alloy 43 or B443, produced by Alcoa Aluminum Co. and others. It has an analysis by weight as follows:

| | |
|---|---|
| Silicon | 4.5 – 6.0% |
| Iron | 0.8% |
| Mangnese | 0.3% |
| Titanium | 0.2% |
| Copper | 0.1% |
| Magnesium | 0.05% |
| Remainder Aluminum | |

This alloy is particularly suited for use in this invention since it does not readily oxidize, is light in weight, and is not particularly expensive. Nickel-chromium alloys may also be used, however they are heavier and more expensive.

The particular alloy used must be utilized in the form of a powder in which the particles are amorphous and are of a size small enough so that they cannot be forced completely through the rubber sheet during the embedding process, yet large enough so that they produce sufficient surface area to facilitate a good bonding between the rubber and acrylic.

The flask and contents are slowly cooled in the closed condition until they have returned to ambient temperature. The flask is then opened and the rubber sheet 70, which will be used as the cured rubber base plate 22 of FIG. 1, is removed. This removal is facilitated by the fact that the plaster molds 59 and 65 soften at elevated temperatures, thus allowing the now-vulcanized rubber base plate 22 to be easily removed. The base plate is cleaned and polished to remove any plaster residue and to expose any metal powder which may have become covered by the rubber during the curing process, thereby allowing only the partially embedded metal particles 32 of FIG. 2 to remain in base plate 22. Such polishing may be accomplished by the use of a wire wheel brush or other abrasive means. To aid in bonding the layer of acrylic material to the base plate, a series of longitudinal cuts may be made on the outer peripheral portion of the base plate. These cuts may be made to a depth of approximately three-fourths the thickness of the base plate.

Figure 9:
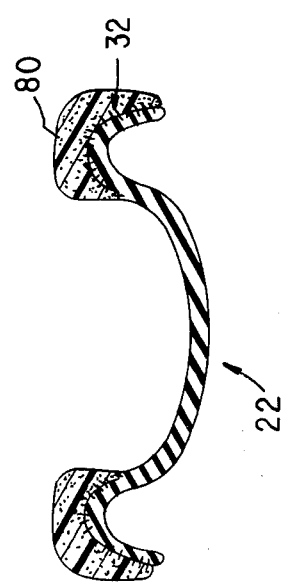

Referring now to FIG. 9, model wax 80 of any conventional type is added to base plate 22 along the plate's periphery to form a "bite block." This assembly is then sent by the denture maker to the patient's dentist who obtains the patient's centric occlusion bite and returns the plate and wax assembly. False teeth of any conventional type are placed in the wax and the assembly returned to the dentist for a final fitting and alignment of the teeth. Once this is accomplished, the assembly is again returned for completion of the denture.

Figure 10:
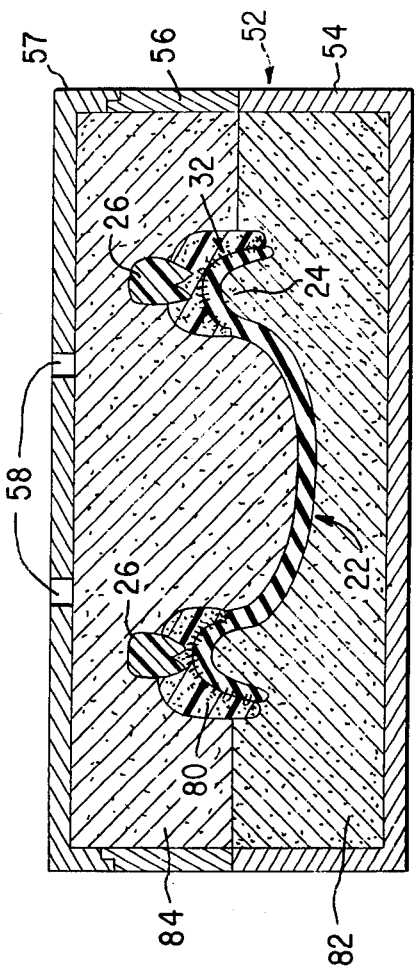

As seen in FIG. 10, the assembly consisting of base plate 22 together with teeth 26 and the wax 80, which has been smoothed and finished after the final adjustment of the teeth, is placed in lower half 54 of flask 52 which has again been filled with dental plaster 82 which conforms to the shape of the base plate. The upper flask half 56 is secured in place and the assembly is filled with plaster 84 which is allowed to set. Once the plaster has set, the flask is opened in hot water, thereby melting the wax 80. The void created in the plaster of paris 84 by the melting of the wax is then filled with liquid acrylic resin and the flask halves are pressed together. The halves are opened, the excess acrylic removed, the flask halves again closed and secured, and the acrylic resin is cured by heating to approximately 165° F for 15 to 30 minutes. The acrylic resin which takes the place of the wax 80 in FIG. 10 thus is formed into the acrylic tooth carrying portion 25 of FIG. 1. The bonding of the rubber base plate and acrylic resin tooth carrying portion is accomplished by the metal alloy particles 32 which were partially embedded in the rubber base plate during the vulcanization or curing step and which portions of these particles extend above the surface of the rubber and are surrounded by and embedded in the portion of the acrylic resin overlying the alveolar ridge portion 24 of the base plate. The particles 32 thus extend between the two dissimilar materials for substantially the full extent of the interface 27 and serve as a means to key the rubber and acrylic portions together.

After the flask has cooled, the completed denture prosthesis is removed from the plaster, given a final polish, and sent to the dentist.

Thus it will be seen that a comfortable, light weight, yet strong denture has been provided in which the base plate of rubber and the tooth carrying portion of acrylic resin have been joined to each other by the use of a powder of metal alloy particles, such joining method being easily performed using ordinary dental laboratory tools, equipment and procedures. While a preferred embodiment of a method for making a denture in accordance with the present invention has been hereinabove described, it will be apparent that other similar materials may be used, that dentures other than a full upper, and that articles other than dentures may be made in accordance with the present invention without departing from the spirit and scope thereof and hence it is intended that the invention be limited only by the appended claims.

What is claimed is:

1. A method of making a composite denture prosthesis, said method comprising:
   a. obtaining an impression of the mouth structure of a user of said denture;
   b. making a model of said mouth structure from said impression, said model including the alveolar ridge portion of said mouth structure;
   c. covering said model with a sheet of curable rubber, conforming said rubber, by use of heat and pressure, to said model to form a base plate, and forming an inwardly extending lip on said base plate, said lip being positioned on the upper, interior alveolar ridge portion of said base plate;
   d. partially embedding metal alloy particles in said alveolar ridge portion of said rubber base plate;
   e. curing said base plate while said base plate is under pressure;
   f. forming an acrylic resin tooth carrying member, said acrylic resin member conforming generally to the shape of the alveolar ridge portion of the mouth structure;
   g. positioning false teeth in said acrylic member;
   h. pressing said acrylic member to said alveolar ridge portion of said base plate to form a denture assembly wherein said acrylic member is formed so as to overlie said alveolar ridge portion of said base plate and to be coincident therewith whereby once said denture is in position in the mouth of the user, only said acrylic member is visible thereby providing an aesthetically pleasing prosthesis;

i. conforming said acrylic member to said lip to provide a smooth transition between said acrylic member and said base;

j. heating said assembly to cure said acrylic resin while subjecting said acrylic member and said base plate to pressure, whereby said metal particles partially embedded in said alveolar ridge portion of said base plate are also partially embedded into said acrylic member and act as a keying means, thereby providing a bond between said rubber base plate and said acrylic resin tooth carrying member.

2. The method of claim 1 including the step of supporting said model in a separable flask and filling said flask with plaster to form a mold conforming to the shape of said model, and further including the step of placing said metal powder to be partially embedded in said rubber base plate on the alveolar ridge portion of said mold contained in an upper portion of said flask whereby said metal alloy particles may be partially embedded in said rubber base plate when said base plate is positioned in said flask during said curing of said base plate.

3. A composite denture prosthesis positionable in the mouth of a user thereof, said prosthesis comprising:

a. a cured rubber base plate, said plate including a section for engaging the alveolar ridge portion of the user's mouth;

b. metal alloy particles partially embedded in an upper face of said alveolar ridge engaging section of said plate; and, c. an acrylic resin tooth carrying portion, said acrylic portion conforming generally to the shape of the alveolar ridge portion of the user's mouth and being joined to said upper face of said alveolar ridge engaging section of said plate by having said metal alloy particles also partially embedded in an interior surface of said acrylic portion whereby said metal alloy particles serve to key said base plate and said acrylic portions of said prosthesis together.

4. A method of bonding together a curable rubber layer and an acrylic resin layer to form a composite article, said method comprising:

a. placing a thin, uniform, layer of metal alloy particles on a surface of said curable rubber;

b. partially embedding said particles into said surface of said rubber;

c. curing said curable rubber layer;

d. positioning a liquid acrylic resin adjacent said partially embedded metal alloy particles; and, e. curing said liquid acrylic resin whereby said metal alloy particles partially embedded in said rubber are also partially embedded in said resin and serve as a keying means, thereby providing a bond between said rubber layer and said acrylic resin layer.

* * * * *